United States Patent
Shinohara

(10) Patent No.: US 11,686,884 B2
(45) Date of Patent: Jun. 27, 2023

(54) LIGHT-ABSORBING FLANGE LENSES

(71) Applicant: Apple Inc., Cupertino, CA (US)

(72) Inventor: Yoshikazu Shinohara, Cupertino, CA (US)

(73) Assignee: Apple Inc., Cupertino, CA (US)

(*) Notice: Subject to any disclaimer, the term of this patent is extended or adjusted under 35 U.S.C. 154(b) by 306 days.

(21) Appl. No.: 16/705,118

(22) Filed: Dec. 5, 2019

(65) Prior Publication Data
US 2020/0183058 A1 Jun. 11, 2020

Related U.S. Application Data

(60) Provisional application No. 62/776,973, filed on Dec. 7, 2018.

(51) Int. Cl.
*G02B 5/22* (2006.01)
*G02B 3/00* (2006.01)
(Continued)

(52) U.S. Cl.
CPC .......... *G02B 3/0062* (2013.01); *G02B 1/04* (2013.01); *G02B 5/22* (2013.01); *H04N 23/55* (2023.01)

(58) Field of Classification Search
CPC .......... G02B 3/0062; G02B 1/04; G02B 5/22; G02B 5/281; G02B 5/04; G02B 13/004;
(Continued)

(56) References Cited

U.S. PATENT DOCUMENTS 4,971,423 A * 11/1990 Nakata ................ G02B 6/1345
385/124
6,903,883 B2 6/2005 Amanai
(Continued)

FOREIGN PATENT DOCUMENTS

CN 106154519 11/2016
CN 107357025 A 11/2017
(Continued)

OTHER PUBLICATIONS

International Search Report and Written Opinion from PCT/US2019/065052, dated Mar. 18, 2020, pp. 1-12.
(Continued)

*Primary Examiner* — Balram T Parbadia
(74) *Attorney, Agent, or Firm* — Robert C. Kowert; Kowert, Hood, Munyon, Rankin & Goetzel, P.C.

(57) ABSTRACT

Light-absorbing flange lenses that may be used in the lens stacks of compact lens systems. In a light-absorbing flange lens, the effective area of the lens is composed of a transparent optical material, and at least a portion of the flange of the lens is composed of an optical material that absorbs at least a portion of the light that enters the flange. Using light-absorbing flange lenses may allow the lens barrel to be eliminated from the lens system, thus reducing the X-Y dimensions of the lens system when compared to conventional compact lens systems that include a lens stack enclosed in a lens barrel. In addition, using a light-absorbing material in the flanges of the light-absorbing flange lenses may reduce or eliminate optical aberrations such as lens flare, haze, and ghosting in images.

22 Claims, 14 Drawing Sheets

(51) Int. Cl.
*G02B 1/04* (2006.01)
*H04N 23/55* (2023.01)

(58) Field of Classification Search
CPC .... G02B 13/0045; G02B 1/041; G02B 5/005; G02B 3/0087; G02B 3/00; H04N 5/2254; B29D 11/00009; B29D 11/00403
See application file for complete search history.

(56) References Cited

U.S. PATENT DOCUMENTS

| | | | |
|---|---|---|---|
| 7,755,857 B2 | 7/2010 | Yu | |
| 2003/0144733 A1* | 7/2003 | Brady | G02B 27/0018 623/6.16 |
| 2004/0047274 A1 | 3/2004 | Amanai | |
| 2005/0226608 A1* | 10/2005 | Kwon | G02B 7/021 396/91 |
| 2005/0264895 A1* | 12/2005 | Chao | G02B 5/005 359/642 |
| 2014/0104691 A1* | 4/2014 | Chang | G02B 7/021 359/611 |
| 2015/0103407 A1* | 4/2015 | Chen | G02B 1/11 359/601 |
| 2015/0346458 A1* | 12/2015 | Asami | G02B 13/04 359/770 |
| 2016/0011403 A1* | 1/2016 | Asami | G02B 9/62 359/740 |
| 2016/0313472 A1* | 10/2016 | Huang | G02B 5/208 |
| 2016/0370579 A1* | 12/2016 | Cho | G02B 5/005 |
| 2017/0090081 A1* | 3/2017 | Ogawa | C09D 1/00 |
| 2017/0217112 A1* | 8/2017 | Bhangale | B29D 11/00894 |
| 2017/0322394 A1 | 11/2017 | Chou et al. | |
| 2018/0292626 A1* | 10/2018 | Chou | G02B 13/0035 |
| 2018/0299590 A1 | 10/2018 | Wan | |
| 2019/0064399 A1* | 2/2019 | Wang | G03B 17/12 |
| 2019/0071028 A1* | 3/2019 | Nakamura | H04N 23/57 |
| 2019/0084255 A1* | 3/2019 | Hanano | B33Y 80/00 |
| 2019/0179126 A1* | 6/2019 | Kim | G02B 5/005 |

FOREIGN PATENT DOCUMENTS

| | | |
|---|---|---|
| CN | 206671648 U | 11/2017 |
| JP | 2007-335036 | 12/2007 |
| KR | 10-2014-0076725 | 6/2014 |
| WO | 2014042178 | 3/2014 |

OTHER PUBLICATIONS

Office Action dated Mar. 23, 2022 in Chinese Patent Application No. 201980080737.X, Apple Inc., pp. 1-13.
Notice of Preliminary Rejection from Korean Patent App. 10-2021-7017685, including English translation, dated Mar. 20, 2023, pages.

* cited by examiner

LIGHT-ABSORBING FLANGE LENSES

PRIORITY INFORMATION

This application claims benefit of priority of U.S. Provisional Application Ser. No. 62/776,973 entitled "LIGHT-ABSORBING FLANGE LENSES" filed Dec. 7, 2018, the content of which is incorporated by reference herein in its entirety.

BACKGROUND

Description of the Related Art

The advent of small, mobile multipurpose devices such as smartphones and tablet or pad devices has resulted in a need for high-resolution, small form factor cameras for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens system with improved imaging quality performance has increased.

SUMMARY OF EMBODIMENTS

Embodiments of the present disclosure may provide a camera in a small package size, referred to as a small format factor camera. Embodiments of a compact lens system are described that may include one or more refractive lens elements, referred to as a lens stack. Embodiments of light-absorbing flange lenses are described that may be used in the lens stack instead of conventional unibody lens elements in which the effective area and flange of the lens elements are composed of the same transparent optical material. In a light-absorbing flange lens, the effective area is composed of a transparent optical material; however, at least a portion of the flange of the lens is composed of an optical light-absorbing material that absorbs at least a portion of the light that enters the flange. Using light-absorbing flange lenses allows the lens barrel to be reduced or eliminated from the lens system. This has a significant impact on the X-Y size of the camera by reducing the size of the camera in the X-Y dimensions. This may allow the X-Y dimensions of the camera to be reduced when compared to a similar camera in which the lens system includes unibody lenses in a lens stack enclosed by an opaque lens barrel.

In addition, using a light-absorbing material in the flanges of the light-absorbing flange lenses may reduce or eliminate optical aberrations such as lens flare, haze, and ghosting in images captured with the camera because the portion of the light entering through the front (object side) of a light-absorbing flange lens is absorbed rather than being reflected by surfaces of the flange and exiting through the image side of the lens element as in unibody lens elements.

In some embodiments, the refractive index of the optical light-absorbing material used in the flange of the lens element may be higher than the refractive index of the optical transparent material used in the effective area of the lens element. This may help to further reduce flare or other aberrations.

Embodiments of the light-absorbing flange lenses may be used in infrared camera applications as well as in visible light camera applications. In some embodiments, the light-absorbing material in the flange of a light-absorbing flange lens is an optical material that absorbs both visible light and infrared (IR) light. However, in some embodiments, the light-absorbing material in the flange of a light-absorbing flange lens is an optical material that absorbs light in the visible portion of the spectrum while transmitting at least a portion of the light in the IR portion of the spectrum. This may allow mechanical features of the camera/lens to be detected using IR light, for example allowing the lenses to be inspected using IR light during or after manufacture.

Figure 1:
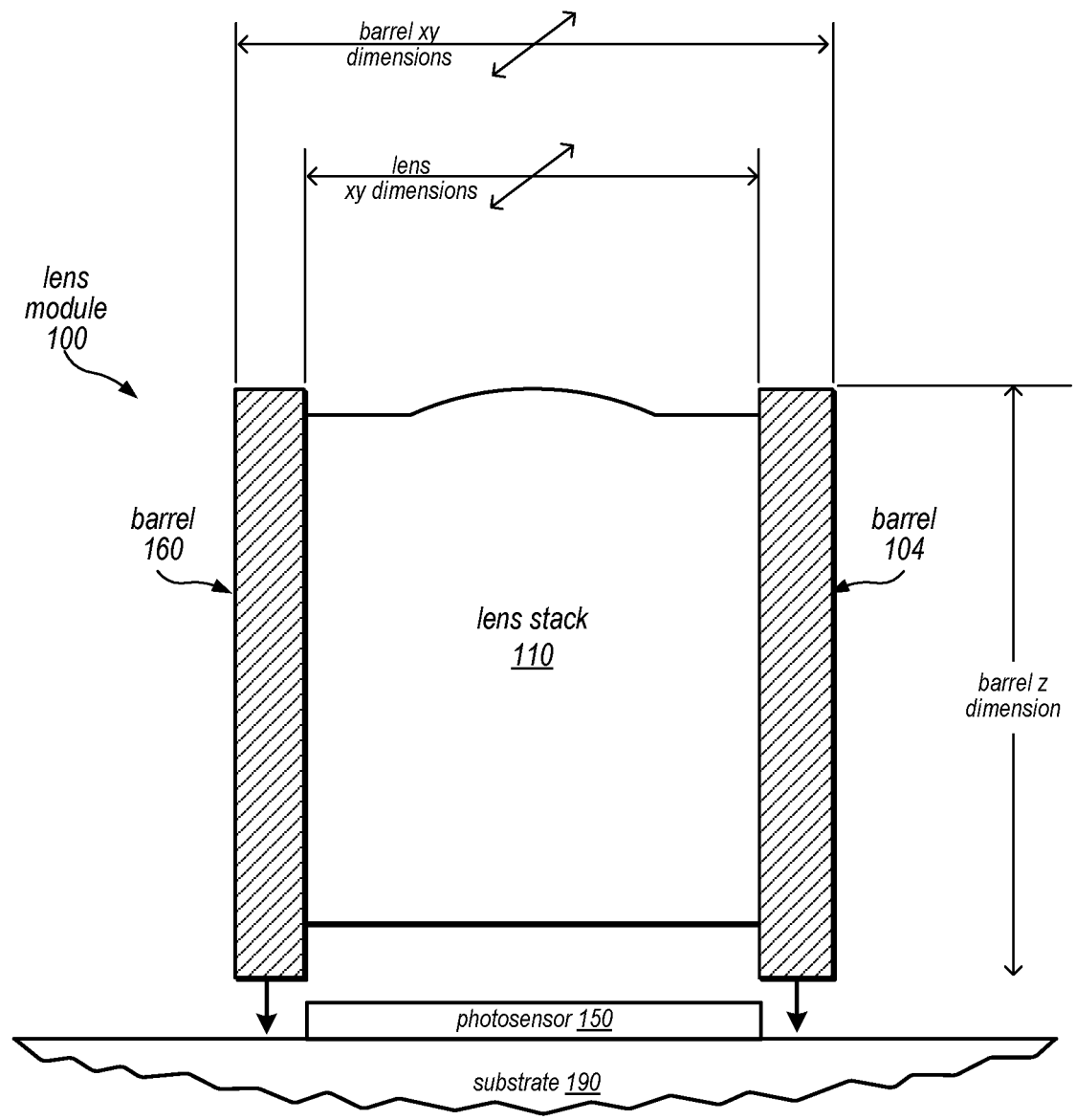
FIG. 1 illustrates a camera lens system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a compact lens system, which may also be referred to as a lens system, are described that may include one or more refractive lens elements, referred to as a lens stack. Embodiments of the compact lens system may be used in cameras with a small package size, referred to as small format factor cameras. Embodiments of small format factor cameras are described that include, but are not limited to, a photosensor and embodiments of the compact lens system.

Conventionally, lens systems for small form factor cameras include a lens stack composed of two or more refractive lens elements. Each lens element in the lens stack may include an effective optical area and a flange area, and may be formed of a transparent optical plastic or glass material. For example, the lens elements may be injection-molded optical plastic. While one or more of the lens elements may be formed of transparent optical materials with different optical characteristics (e.g., Abbe number and refractive index (n)), the flange and effective optical area of each lens element are conventionally formed of the same optical material. These lens elements may be referred to as "unibody" lenses as the flange and effective optical area are both formed of the same optical material, for example via an injection molding process. Using unibody lenses requires the lens system to include a lens barrel composed of an opaque material to cover the lens stack.

Problems with these conventional lens systems include, but are not limited to:

The lens barrel increases the X-Y size of the lens system. Minimizing the X-Y size of the lens system is desirable for certain applications of small form factor devices. For example, in many small form factor devices such as smartphones and tablet or pad devices, a front-facing camera may be mounted in the bezel, between the screen and the edge of the device. Thus, the X-Y dimensions of the lens system of a front-facing camera limit the size of the bezel, as the bezel has to be wide enough to accommodate at least the front portion of the lens system.

The flanges of the unibody lenses may cause optical aberrations such as lens flare, haze, and ghosting in images captured with the camera. This is because a portion of the light entering through the front (object side) of a unibody lens element may be reflected into the flange, and a portion of that light may be reflected by surfaces of the flange and exit through the image side of the lens element.

Embodiments of light-absorbing flange lenses are described that may be used in a lens stack instead of conventional unibody lens elements. In a light-absorbing flange lens, the effective area is composed of a transparent optical material; however, the flange of the lens is at least partially composed of a material that absorbs at least a portion of the light that enters the flange. Using light-absorbing flange lenses allows the lens barrel to be eliminated from the lens system. This has a significant impact on the X-Y size of the camera by reducing the size of the camera in the X-Y dimensions. This may allow the X-Y dimensions of the camera to be reduced when compared to a similar camera in which the lens system includes unibody lenses in a lens stack enclosed by an opaque lens barrel. For example, in many small form factor devices such as smartphones and tablet or pad devices, a front-facing camera may be mounted in the bezel, between the screen and the edge of the device. Reducing the X-Y dimensions of the lens system of a front-facing camera by eliminating the lens barrel may allow a narrower bezel to be used on the device than would be required by a conventional camera module that includes a lens barrel.

In addition, using a light-absorbing material in the flanges of the lenses may reduce or eliminate optical aberrations such as lens flare, haze, and ghosting in images captured with the camera because the portion of the light entering through the front (object side) of a light-absorbing flange lens is absorbed rather than being reflected by surfaces of the flange and exiting through the image side of the lens element as in unibody lens elements.

Embodiments of a small format factor camera with a lens system that includes light-absorbing flange lenses in the lens stack as described herein may be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers, and so on. However, note that aspects of the camera (e.g., the lens system and photosensor) may be scaled up or down to provide cameras with larger or smaller package sizes. In addition, embodiments of the camera system may be implemented as stand-alone digital cameras. In addition to still (single frame capture) camera applications, embodiments of the camera system may be adapted for use in video camera applications. In addition to visible light camera applications, embodiments of the light-absorbing flange lenses may be used in infrared camera applications. In some embodiments, a camera as described herein may be included in a device along with one or more other cameras such as a wider-field small format camera or a telephoto or narrow angle small format camera, which would for example allow the user to select between the different camera formats (e.g., normal, telephoto or wide-field) when capturing images with the device. In some embodiments, two or more small format cameras as described herein may be included in a device, for example as front-facing and rear-facing cameras in a mobile device.

FIG. 1 illustrates a camera lens system 100 that may be used in small format factor cameras, according to some embodiments. The lens system 100 may include a lens stack 110 including one or more refractive lens elements. The lenses in the lens stack 110 may be mounted or affixed inside a lens barrel 160. A photosensor 150 may be located on the image side of the lens stack 110 when the lens system 100 is attached to a substrate 190 that holds the photosensor 150. The lens system 100 may also include at least one aperture stop (not shown), for example at a first lens element in the lens stack 110. The lens system 100 may also, but does not necessarily, include an IR filter that may, for example, be mounted or attached at the rear (image side) of the lens barrel 110.

Figures 2A, 2B:
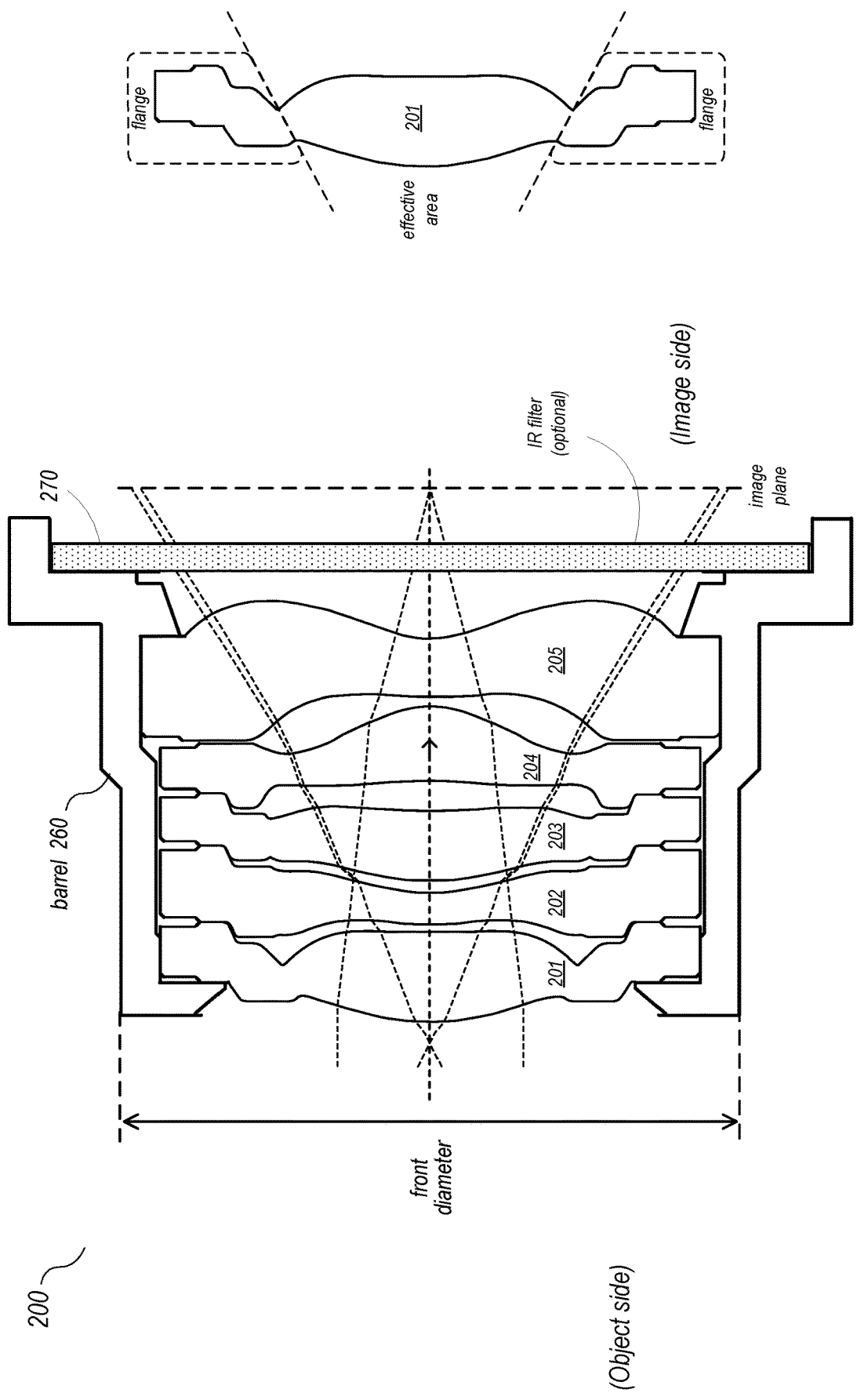
FIG. 2A is a cross-sectional illustration of an example camera lens system that includes refractive lens elements mounted in a lens barrel, according to some embodiments.
FIG. 2B illustrates the flange and effective portions of a lens element, according to some embodiments.

FIG. 2A is a cross-sectional illustration of an example camera lens system 200 that includes lens elements mounted in a lens barrel, according to some embodiments. The lens system 200 may include a lens stack that includes two or more lens elements (five lens elements 201-205, in this example) with refractive power arranged along an optical axis in order from an object side to an image side and located within a lens barrel 260. An aperture stop may be included in the lens stack, for example at the first lens element or between the first and second lens elements. The lens system 200 may also, but does not necessarily, include an IR filter assembly 270 that may be mounted or attached to the rear (image side) of the lens barrel 260.

The lens elements 201-205 in the lens stack as shown in FIG. 2A are given by way of example and are not intended to be limiting. Optical characteristics, materials (e.g., plastics or glass), shapes, spacing, and/or sizes of the lens elements may be selected so that light rays are correctly refracted through the lens elements in the lens stack to form an image at an image plane on or proximate to a photosensor of a camera. More or fewer lens elements (e.g., four lens elements, six lens elements, etc.) may be used in the lens stack, and one or more of the lens elements in the lens stack may be of different shapes, geometries, sizes, or materials with different optical properties (e.g., refractive index or Abbe number). Spacing between the lens elements in the lens stack may be different than shown, and various power orders for the lens elements in the lens stack may be used. For example, in the example five lens element lens stack of FIG. 2A, the power order, from the first lens element to the fifth lens element, may be PNNNP, PNPNP, or some other order, where P indicates a lens with positive refractive power, and N represents a lens with negative refractive power.

FIG. 2B illustrates the flange and effective portions of an example lens element 201 in the lens stack shown in FIG. 2A, according to some embodiments. As shown in FIG. 2A, at least one lens element in the lens stack may include an effective optical area and a flange area, and may be formed of a transparent optical plastic or glass material. For example, the lens elements may be injection-molded optical plastic. While one or more of the lens elements may be formed of transparent optical materials with different optical characteristics (e.g., Abbe number and refractive index (n)), the flange and effective optical area of each lens element are conventionally formed of the same optical material. These lens elements may be referred to as "unibody" lenses as the flange and effective optical area are both formed of the same optical material, for example via an injection molding process.

As previously noted, using unibody lenses as shown in FIGS. 2A and 2B requires a lens barrel 260 composed of an opaque material to cover the lens stack. However, the lens barrel 260 increases the X-Y size of the lens system. In addition, the flanges of the unibody lenses may cause optical aberrations such as lens flare, haze, and ghosting in images captured with the camera.

Figure 3:
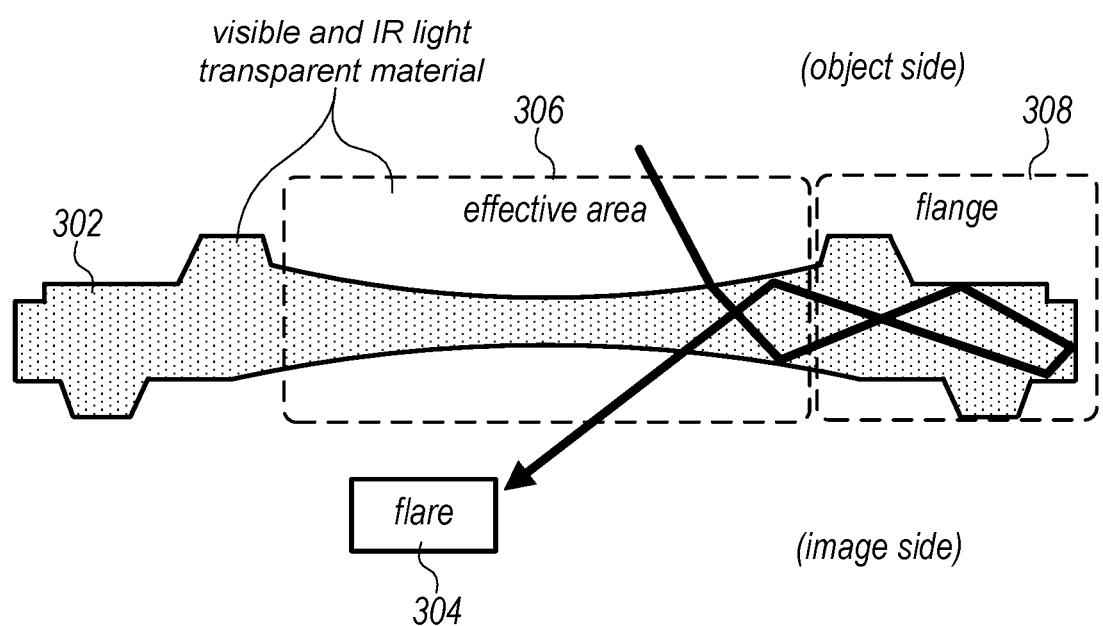
FIG. 3 illustrates flare caused by the flange of a unibody lens element, according to some embodiments.

FIG. 3 illustrates aberrations (e.g., flare) caused by the flange of a unibody lens element, according to some embodiments. As shown in FIG. 3, the flange of a unibody lens may cause optical aberrations such as lens flare, haze, and ghosting in images captured with a camera. This is because a portion of the light entering through the front (object side) of the effective area of a unibody lens element may be reflected into the flange, and a portion of that light may be reflected by surfaces of the flange and exit through the image side of the lens element.

Figure 4A:
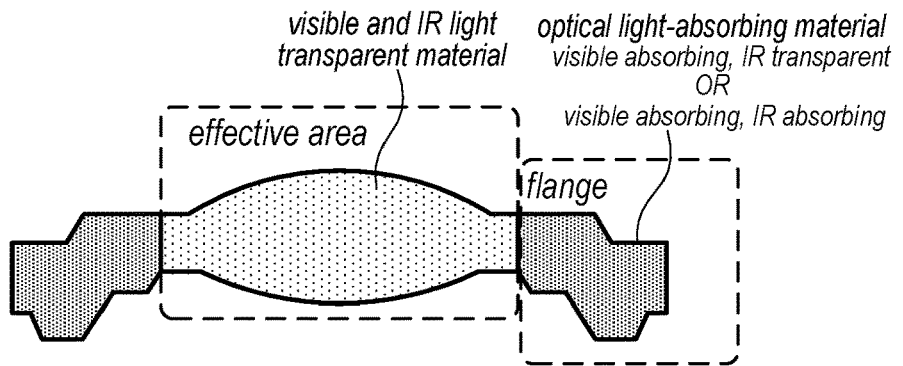
FIGS. 4A through 4C illustrate flanges of lens elements that are at least partially composed of an optical light-absorbing material to reduce or eliminate optical aberrations such as flare, according to some embodiments.
Figure 4B:
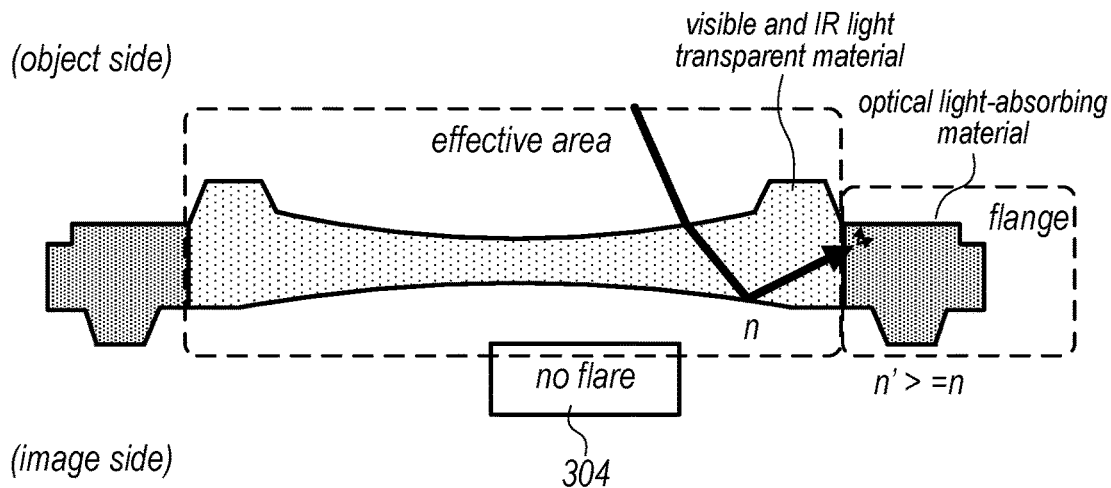
Figure 4C:
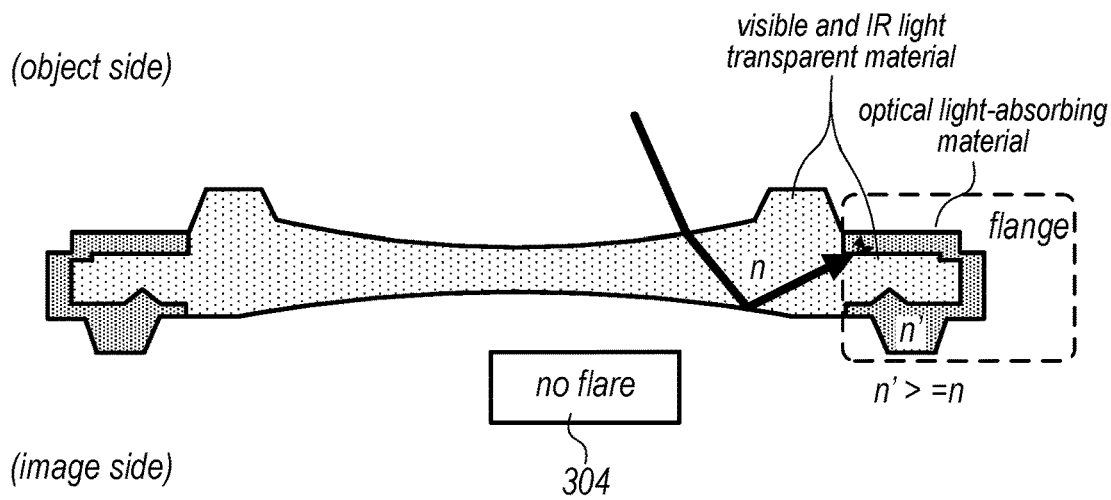
Figure 10:
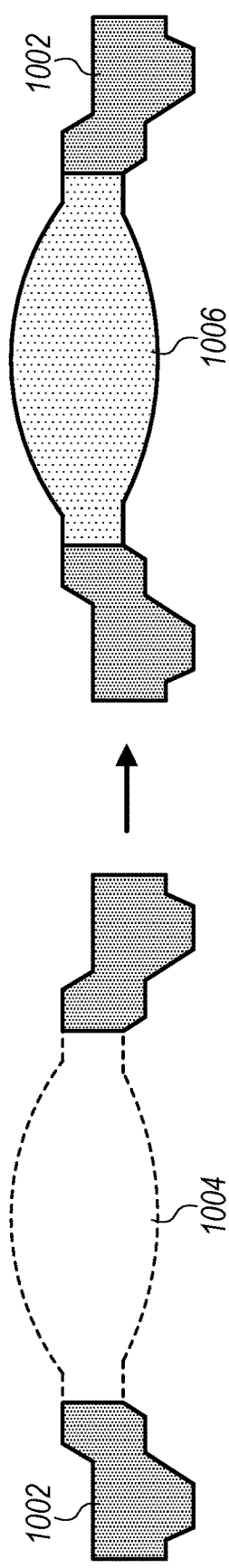
FIG. 10 illustrates an injection molding process for forming a light-absorbing flange lens in which the flange is formed before the effective (center) area of the lens element, according to some embodiments.
Figure 11A:
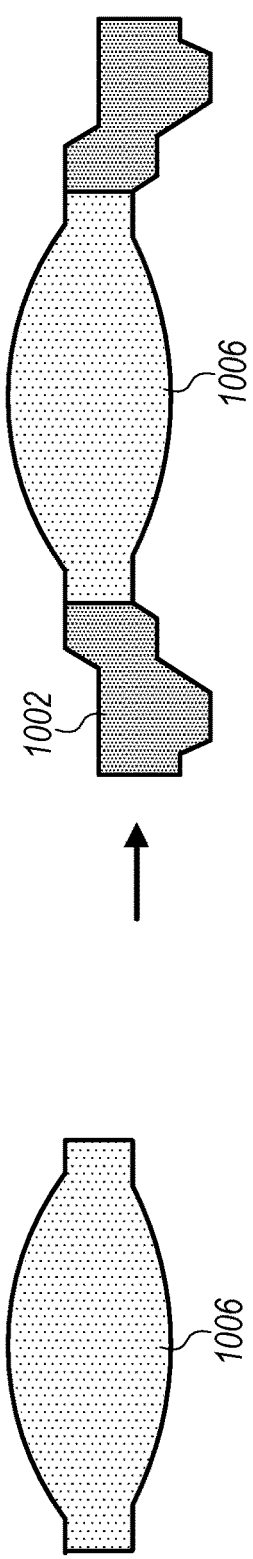
FIG. 11A illustrates an injection molding process for forming a light-absorbing flange lens in which the effective (center) area of the lens element is formed before the flange, according to some embodiments.
Figure 11B:
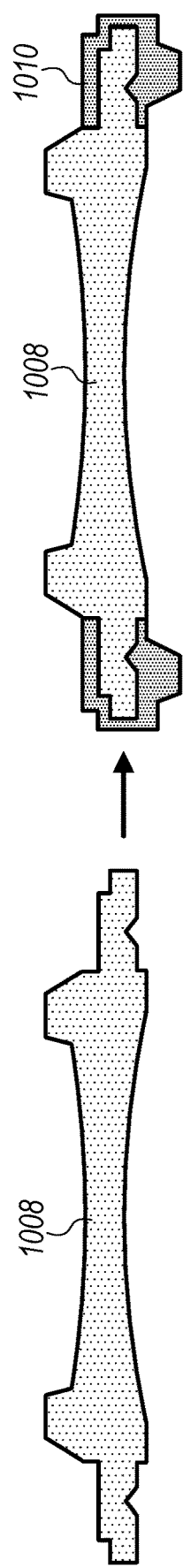
FIG. 11B illustrates an injection molding process for forming a light-absorbing flange lens in which the effective (center) area of the lens element and part of the flange formed of a transparent material before a light-absorbing part of the flange is formed, according to some embodiments.

FIGS. 4A through 4C illustrate flanges of lens elements that are at least partially composed of an optical light-absorbing material to reduce or eliminate optical aberrations such as flare, according to some embodiments. As shown in FIG. 4A, the effective area of the lens element is composed of a visible and infrared (IR) light transparent optical material. The flange of the lens element is at least partially composed of a material that absorbs at least a portion of the light that enters the flange. In some embodiments, the flange may be composed of a material that absorbs light in the visible portion of the spectrum and in the IR portion of the spectrum. However, in some embodiments, the flange may be composed of a material that absorbs light in the visible portion of the spectrum while transmitting at least a portion of the light in the IR portion of the spectrum. This may allow mechanical features of the camera/lens to be detected using IR light, for example allowing the lenses to be inspected using IR light during or after manufacture. As shown in FIG. 4B, using a material that absorbs at least a portion of light in the flange of the lens element may reduce or eliminate optical aberrations such as flare. As shown in FIG. 4B, in some embodiments, the refractive index n' of the light-absorbing material used in the flange of the lens element may be higher than the refractive index n of the optical transparent material used in the effective area of the lens element. This may help to further improve the reduction of flare or other aberrations. FIGS. 10 and 11A show example methods for manufacturing light-absorbing lens elements as illustrated in FIGS. 4A and 4B FIG. 4C shows an example in which the effective area of the lens element and a first (e.g., inner) part of the flange are composed of a visible and infrared (IR) light transparent optical material, and a second (e.g., outer) part of the flange is composed of a material that absorbs at least a portion of the light that enters the flange. In some embodiments, the light-absorbing material absorbs light in the visible portion of the spectrum and in the IR portion of the spectrum. However, in some embodiments, the light-absorbing material absorbs light in the visible portion of the spectrum while transmitting at least a portion of the light in the IR portion of the spectrum. As shown in FIG. 4C, using the light-absorbing material in the flange may reduce or eliminate optical aberrations such as flare. As shown in FIG. 4C, in some embodiments, the refractive index n' of the light-absorbing material used in the flange of the lens element may be greater than or equal to the refractive index n of the optical transparent material used in the effective area of the lens element. FIG. 11B shows an example method for manufacturing a light-absorbing lens element as illustrated in FIG. 4C.

In some embodiments, a light-absorbing flange lens may be composed of two different plastic materials, with a transparent plastic material used for the effective area of the lens element and a light-absorbing material that absorbs at least a portion of light used in at least a portion of the flange. In some embodiments, the light-absorbing flange lens may be formed using an injection molding process. In some embodiments, the light-absorbing flange lens may be formed using an injection molding process in which the effective area is formed first, followed by the flange. However, in some embodiments, the light-absorbing flange lens may be formed using an injection molding process in which the flange is formed first, followed by the effective area.

Note that, in some embodiments, the entire flange may be formed of the light-absorbing material. However, in some embodiments, a portion but not all of the flange may be formed of the light-absorbing material. Further note that, in some embodiments of a lens stack, all of the lens elements may be light-absorbing flange lenses as described herein. However, in some embodiments, one or more of the lens elements in the lens stack may be light-absorbing flange lenses as described herein, while one or more others of the lens elements in the lens stack may be unibody lenses.

Figure 5:
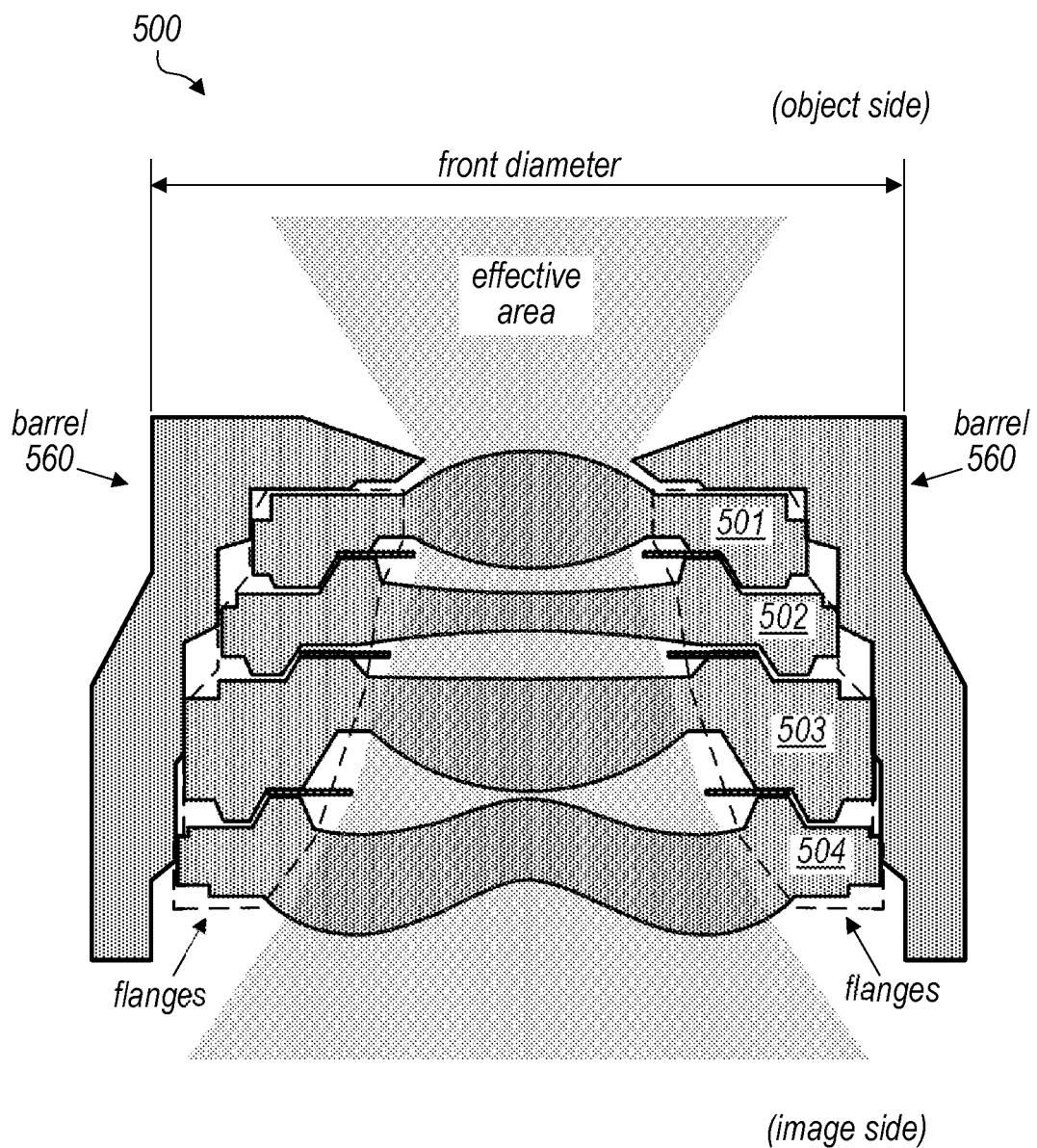
FIG. 5 is a cross-sectional illustration of another example camera lens system that includes refractive lens elements mounted in a lens barrel, according to some embodiments.

FIG. 5 is a cross-sectional illustration of another example camera lens system that includes refractive lens elements mounted in a lens barrel, according to some embodiments. The lens system 500 may include a lens stack that includes two or more lens elements (four lens elements 501-504, in this example) with refractive power arranged along an optical axis in order from an object side to an image side and located within a lens barrel 560. An aperture stop may be included in the lens stack, for example at the first lens element or between the first and second lens elements. The lens system 500 may also, but does not necessarily, include an IR filter assembly that may be mounted or attached to the rear (image side) of the lens barrel 560.

The lens elements 501-504 in the lens stack as shown in FIG. 5 are given by way of example and are not intended to be limiting. Optical characteristics, materials (e.g., plastics or glass), shapes, spacing, and/or sizes of the lens elements may be selected so that light rays are correctly refracted through the lens elements in the lens stack to form an image at an image plane on or proximate to a photosensor of a camera. More or fewer lens elements (e.g., four lens elements, six lens elements, etc.) may be used in the lens stack, and one or more of the lens elements in the lens stack may be of different shapes, geometries, sizes, or materials with different optical properties (e.g., refractive index or Abbe number). Spacing between the lens elements in the lens stack may be different than shown, and various power orders for the lens elements in the lens stack may be used.

As shown in FIG. 5, the lens elements in the lens stack may include an effective optical area and a flange area, and may be formed of a transparent optical plastic or glass material. For example, the lens elements may be injection-molded optical plastic. While one or more of the lens elements may be formed of transparent optical materials with different optical characteristics (e.g., Abbe number and refractive index (n)), the flange and effective optical area of each lens element are conventionally formed of the same optical material. These lens elements may be referred to as "unibody" lenses as the flange and effective optical area are both formed of the same optical material, for example via an injection molding process.

As previously noted, using unibody lenses as shown in FIG. 5 requires a lens barrel 560 composed of an opaque material to cover the lens stack. However, the lens barrel 560 increases the X-Y size of the lens system. In addition, the flanges of the unibody lenses may cause optical aberrations such as lens flare, haze, and ghosting in images captured with the camera.

Figure 6:
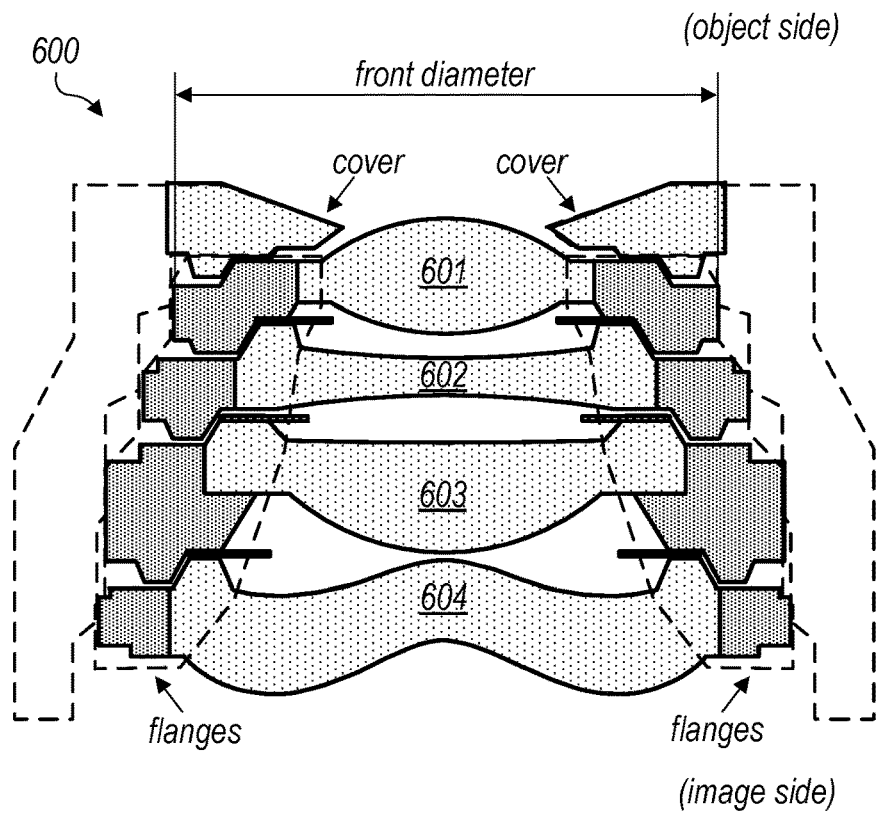
FIG. 6 is a cross-sectional illustration of an example camera lens system that includes refractive lens elements in which the flanges are at least partially composed of an optical light-absorbing material that allows the lens barrel to be reduced or eliminated, thus reducing the diameter of the lens system, according to some embodiments.

FIG. 6 is a cross-sectional illustration of an example camera lens system 600 that includes refractive lens elements in which the flanges are at least partially composed of a light-absorbing material that allows the lens barrel to be reduced or eliminated, thus reducing the diameter of the lens system, according to some embodiments. The lens elements 601-604 are similar in shape and optical characteristics to the lens elements 501-504 shown in FIG. 5. However, at least a portion of the flanges of the lens elements 601-604 are composed of a material that absorbs at least a portion of the light that enters the flanges. In some embodiments, the flanges may be composed of a material that absorbs light in the visible portion of the spectrum and in the IR portion of the spectrum. However, in some embodiments, the flanges may be composed of a material that absorbs light in the visible portion of the spectrum while transmitting at least a portion of the light in the IR portion of the spectrum. This may allow mechanical features of the camera/lens to be detected using IR light, for example allowing the lenses to be inspected using IR light during or after manufacture. Using an optical material that absorbs at least a portion of light for the flange of the lens element may reduce or eliminate optical aberrations such as flare. In addition, using the light-absorbing material for the flanges allows the lens barrel to be at least partially eliminated, thus reducing the front diameter of the lens system 600 when compared to lens system 500. This may allow the X-Y dimensions of the camera to be reduced when compared to a similar camera in which a lens system 500 as shown in FIG. 5 includes unibody lenses in a lens stack enclosed by an opaque lens barrel 560. For example, in many small form factor devices such as smartphones and tablet or pad devices, a front-facing camera may be mounted in the bezel, between the screen and the edge of the device. Reducing the X-Y dimensions of the lens system of a front-facing camera by eliminating the lens barrel may allow a narrower bezel to be used on the device than would be required by a conventional camera module that includes a lens barrel as shown in FIG. 5.

Figure 7:
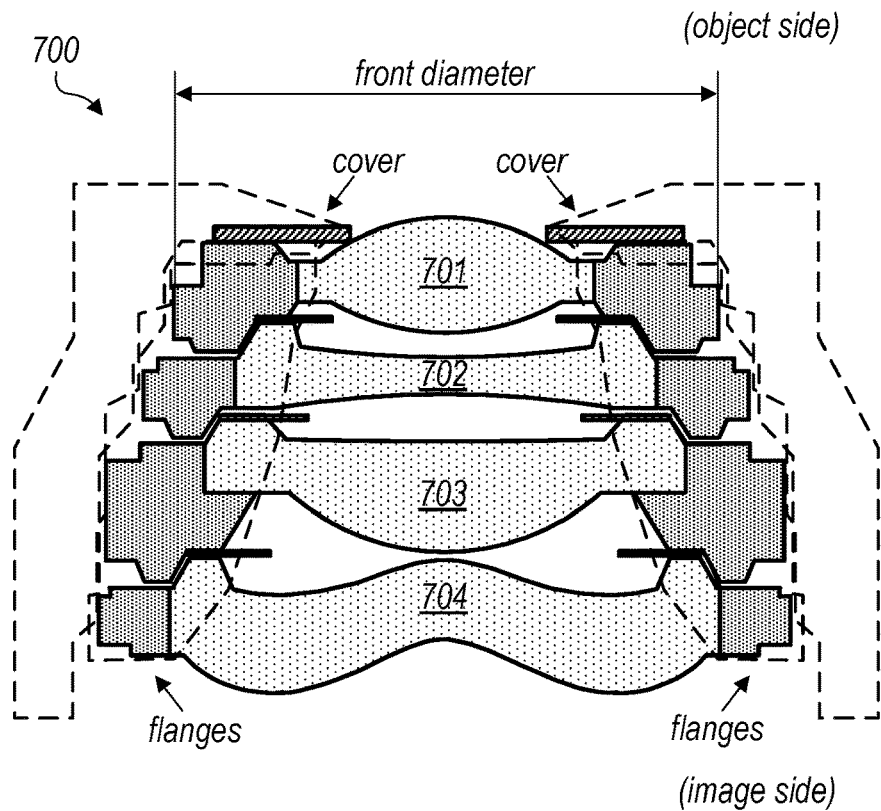
FIG. 7 is a cross-sectional illustration of another example camera lens system that includes refractive lens elements in which the flanges are at least partially composed of an optical light-absorbing material that allows the lens barrel to be reduced or eliminated, thus reducing the diameter of the lens system, according to some embodiments.

FIG. 7 is a cross-sectional illustration of another example camera lens system that includes refractive lens elements in which the flanges are at least partially composed of a light-absorbing material that allows the lens barrel to be reduced or eliminated, thus reducing the diameter of the lens system, according to some embodiments. The lens elements 701-704 are similar in shape and optical characteristics to the lens elements 501-504 shown in FIG. 5 and the lens elements 601-604 as shown in FIG. 6. At least a portion of the flanges of the lens elements 701-704 are composed of an optical material that absorbs at least a portion of the light that enters the flanges. Using an optical light-absorbing material that absorbs at least a portion of light for the flange of the lens element may reduce or eliminate optical aberrations such as flare. In addition, using the light-absorbing material for the flanges allows the lens barrel to be at least partially eliminated, thus reducing the front diameter of the lens system 700 when compared to lens system 500. In addition, at least the first lens element 701 and the lens cover have been reconfigured when compared to the lens system 600 of FIG. 6 to further reduce the front diameter of the lens system 700 when compared to lens system 600.

Figure 8:
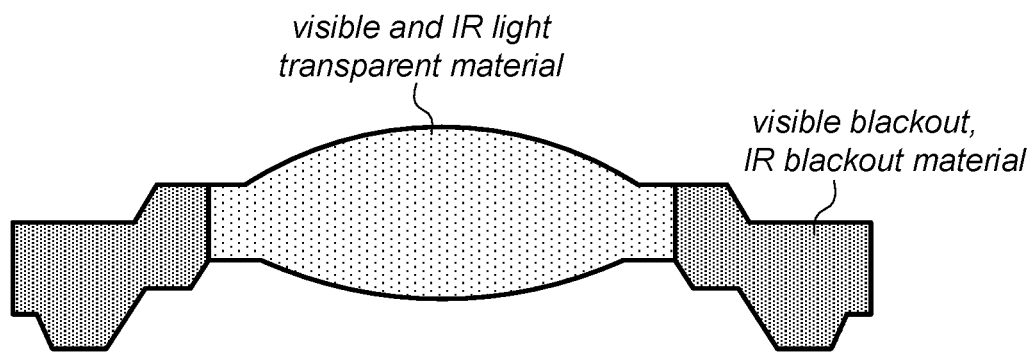
FIG. 8 illustrates a flange of a lens element that is at least partially composed of a material that absorbs visible light and IR light, according to some embodiments.

FIG. 8 illustrates a flange of a lens element that is at least partially composed of a material that absorbs visible light and IR light, according to some embodiments. The effective area of the lens element is composed of a visible and infrared (IR) light transparent optical material. The flange of the lens element is at least partially composed of an optical material that absorbs visible light and IR light that enters the flange. Using a light-absorbing material for the flanges of the light-absorbing flange lenses may reduce or eliminate optical aberrations such as lens flare, haze, and ghosting in images captured with the camera because the portion of the light entering through the front (object side) of a light-absorbing flange lens is absorbed rather than being reflected by surfaces of the flange and exiting through the image side of the lens element as in unibody lens elements. In some embodiments, the refractive index of the optical light-absorbing material used in the flange of the lens element may be higher than the refractive index of the optical transparent material used in the effective area of the lens element. This may help to further improve the reduction of flare or other aberrations. In addition, the flange composed of an optical light-absorbing material may allow the lens barrel to be reduced or eliminated, thus reducing the diameter of the lens system.

Figure 9:
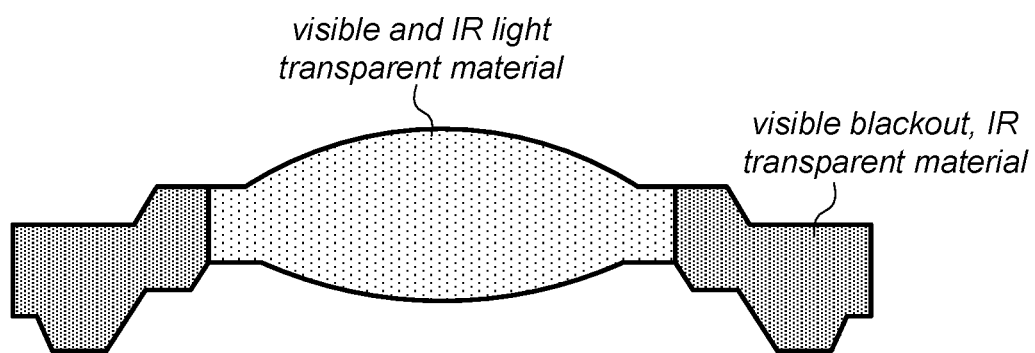
FIG. 9 illustrates a flange of a lens element that is at least partially composed of a material that absorbs visible light and transmits infrared (IR) light, according to some embodiments.

FIG. 9 illustrates a flange of a lens element that is at least partially composed of an optical material that absorbs visible light and transmits infrared (IR) light, according to some embodiments. In some embodiments, the flange of a light-absorbing flange lens as described herein may be composed of an optical material that absorbs light in the visible portion of the spectrum while transmitting at least a portion of the light in the IR portion of the spectrum. This may allow mechanical features of the camera/lens to be detected using IR light, for example allowing the lenses to be inspected using IR light during or after manufacture.

FIGS. 10, 11A, and 11B illustrate example methods for manufacturing light-absorbing flange lenses as described herein, according to some embodiments. In some embodiments, a light-absorbing flange lens may be composed of two different plastic materials, with a transparent plastic material used for the effective area of the lens element and an optical material that absorbs at least a portion of light used for at least a portion of the flange. In some embodiments, the light-absorbing flange lens may be formed using an injection molding process. As illustrated in FIG. 10, in some embodiments, the light-absorbing flange lens may be formed using an injection molding process in which the flange is formed first, followed by the effective area. However, as illustrated in FIG. 11A, in some embodiments, the light-absorbing flange lens may be formed using an injection molding process in which the effective area is formed first, followed by the flange. As illustrated in FIG. 11B, in some embodiments, the light-absorbing flange lens may be formed using an injection molding process in which the effective (center) area of the lens element and part of the flange are formed of a transparent material before a light-absorbing part of the flange is formed.

Note that, in some embodiments, the entire flange may be formed of the optical light-absorbing material. However, in some embodiments, a portion but not all of the flange may be formed of the optical light-absorbing material, for example as illustrated in FIG. 11B. Further note that, in some embodiments of a lens stack, all of the lens elements may be light-absorbing flange lenses as described herein. However, in some embodiments, one or more of the lens elements in the lens stack may be light-absorbing flange lenses as described herein, while one or more others of the lens elements in the lens stack may be unibody lenses.

Figure 12:
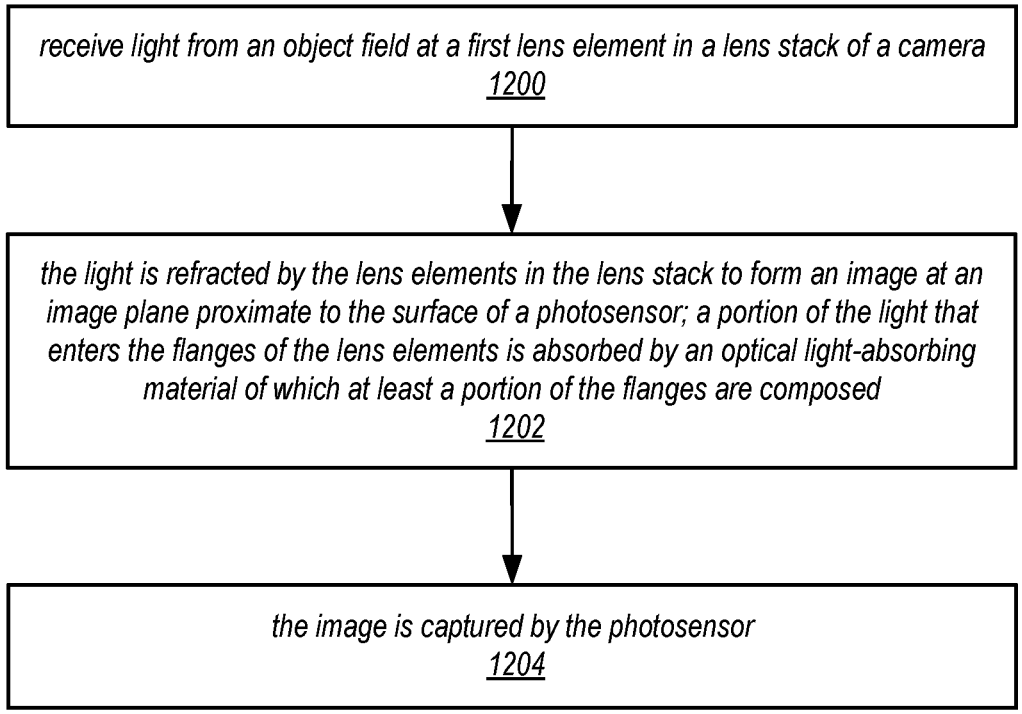
FIG. 12 is a high-level flowchart of a method for capturing images using a camera that includes a lens stack in which the flanges of one or more of the lens elements are at least partially composed of a light-absorbing material as illustrated in FIGS. 4A and 4B, according to some embodiments.

FIG. 12 is a high-level flowchart of a method for capturing images using a camera that includes a lens stack in which the flanges of one or more of the lens elements are at least partially composed of an optical light-absorbing material as illustrated in FIGS. 4A and 4B, according to some embodiments. As indicated at 1200, light from an object field in front of the camera is received at a first lens element in the lens stack. The lens stack may include multiple (e.g., three, four, five, etc.) lens elements arranged along an optical axis of the camera from the first lens element to a last lens element. FIGS. 6, 7 and 9 show non-limiting examples of lens stacks that may be used. As indicated at 1202, the light is refracted by the lens elements in the lens stack to form an image at an image plane at or near the surface of a photosensor of the camera. A portion of the light that enters the flanges of the lens elements is absorbed by a light-absorbing material of which at least a portion of the flanges are composed. As indicated at 1204, the image is captured by the photosensor. While not shown, in some embodiments, the light may pass through an infrared filter that may for example be located between the last lens element in the lens stack and the photosensor.

Light-Absorbing Flanges for Other Optical Elements

Figure 13A:
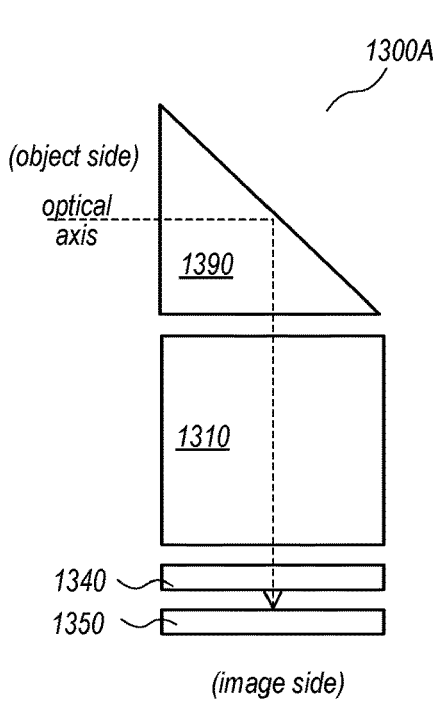
FIGS. 13A through 13C illustrate example optical systems that include prisms that fold the optical axis, according to some embodiments.
Figure 13B:
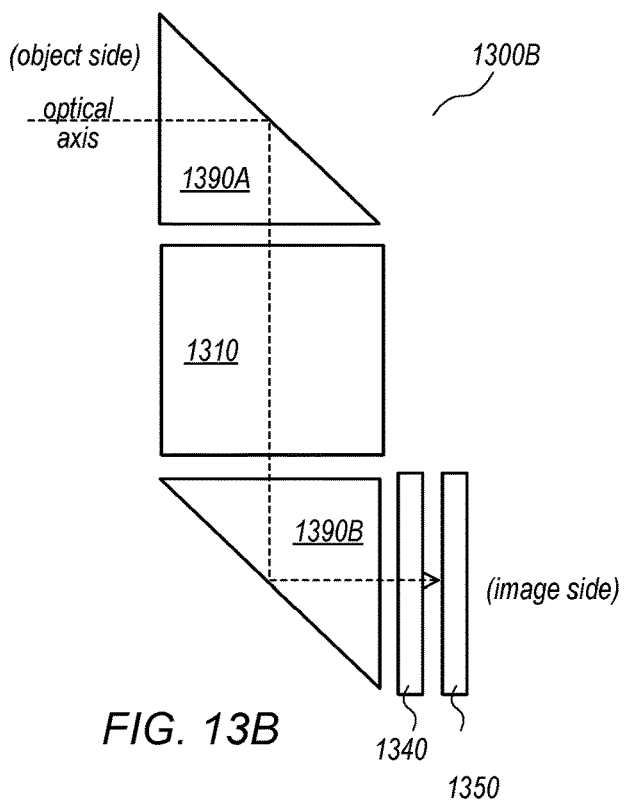

Embodiments of refractive lenses with light-absorbing flanges for optical systems have been described. However, an optical system or camera may include other optical elements, for example one or more prisms that fold the optical axis of the optical system and/or one or more filters such as infrared (IR) filters, for example as shown in FIGS. 13A and 13B. FIG. 13A shows an optical system 1300A that includes, in order from an object side to an image side on an optical axis, a prism 1390 that folds the optical axis, a lens stack 1310 that includes one or more refractive lens elements (for example, one or more light-absorbing flange lenses as illustrated in FIGS. 4 through 9), an IR filter 1340 (optional), and a photosensor 1350. Prism 1390 may, but does not necessarily, have optical power. FIG. 13B shows an optical system 1300B that includes, in order from an object side to an image side on an optical axis, a first prism 1390A that folds the optical axis, a lens stack 1310 that includes one or more refractive lens elements (for example, one or more light-absorbing flange lenses as illustrated in FIGS. 4 through 9), a second prism 1390B that folds the optical axis, an IR filter 1340 (optional), and a photosensor 1350. One or both prisms 1390A and 1390B may, but do not necessarily, have optical power.

Figure 13C:
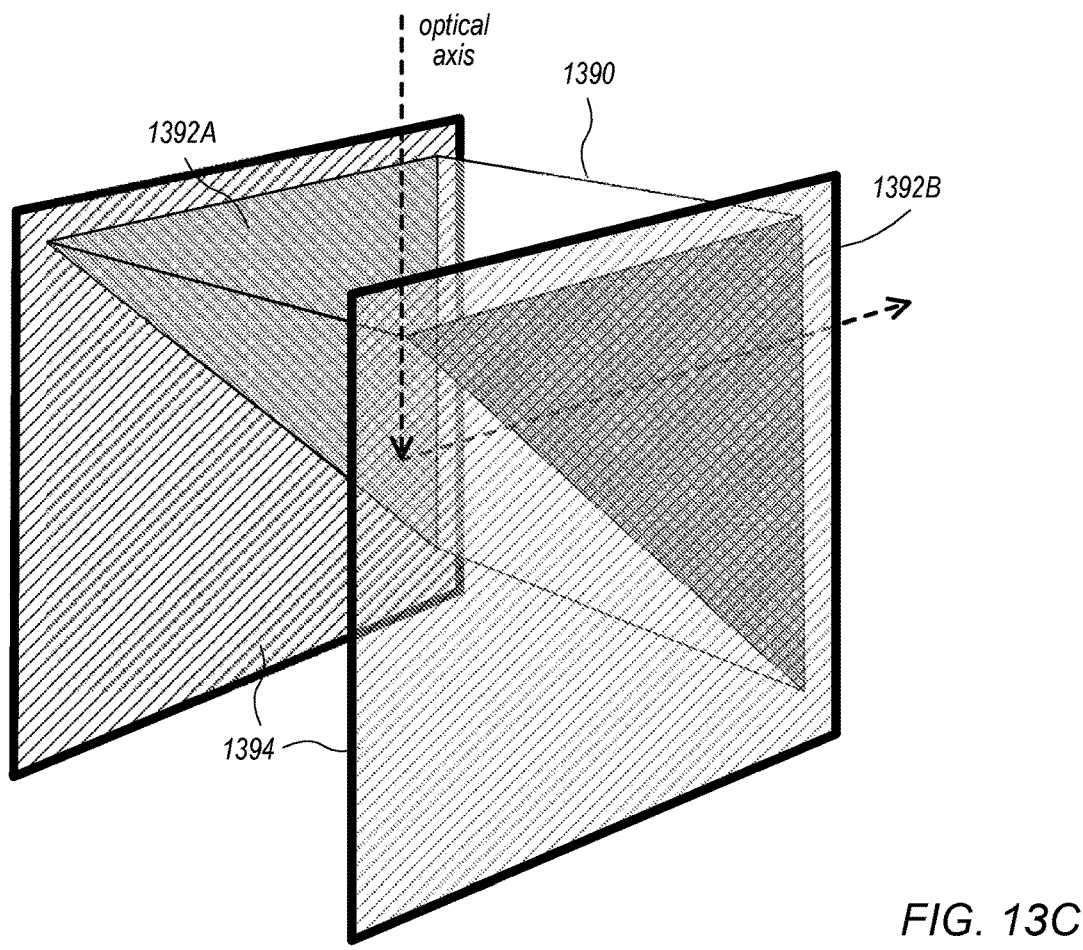

In conventional optical systems that include an IR filter 1340, the IR filter 1340 is typically mounted in a barrel with the refractive lenses in the lens stack, for example as shown in FIG. 2A. As shown in FIG. 13C, in conventional optical systems that include prism(s) 1390 as shown in FIGS. 13A and 13B, the off-axis sides 1392A and 1392B of the prism 1390 are typically coated with a black material, and the prism 1390 is mounted in a relatively thick, rigid holder 1394 that is necessary to provide mechanical strength.

Various embodiments of prisms that are formed with light-absorbing holders are described that may be used in the lens stack instead of conventional prisms as shown in FIG. 13C. In these prisms, the effective area is composed of a transparent optical material; however, the holder is composed of an optical light-absorbing material that absorbs at least a portion of the light that enters the holder. The holders may be less thick than the holders used in conventional optical systems as shown in FIG. 13C, and may thus reduce the total size of the optical system. This may have a significant impact on the X-Y size of the camera by reducing the size of the camera in the X-Y dimensions.

In conventional prisms as shown in FIG. 13C, the off-axis sides 1392A and 1392B of the prism 1390 may cause total internal reflection (TIR) of some light rays that strike the sides, which may result in "TIR flare" in images captured by the camera. In addition to reducing the size of the optical system, using a light-absorbing material in the holders of the prisms may reduce or eliminate TIR caused by the off-axis sides of the prism because the light rays are absorbed by the material of the holder rather than being reflected by the surfaces of the prism.

Similarly, filters such as IR filter 1340 shown in FIGS. 13A and 13B may be formed with a light-absorbing holder to reduce size of the optical system and/or to reduce or eliminate TIR at the edges of the filter.

In some embodiments, a prism formed with a holder as described herein may be composed of two different plastic materials, with a transparent plastic material used for the effective area of the prism and an optical material that absorbs at least a portion of light used for the holder. In some embodiments, the prism and holder may be formed using an injection molding process, for example a process similar to those described in reference to FIGS. 10 through 12 for manufacturing light-absorbing flange lenses. Similarly, a filter formed with a holder as described herein may be composed of two different plastic materials, with a plastic material with properties that vary based on the purpose of the filter used for the effective area of the filter (e.g., IR filtering properties for an IR filter) and an optical material that absorbs at least a portion of light used for the holder.

Embodiments of prisms and/or filters formed with light-absorbing holders may be used in infrared camera applications as well as in visible light camera applications. In some embodiments, the light-absorbing material in the holder is an optical material that absorbs both visible light and infrared (IR) light. However, in some embodiments, the light-absorbing material is an optical material that absorbs light in the visible portion of the spectrum while transmitting at least a portion of the light in the IR portion of the spectrum. This may allow mechanical features of the optical system to be detected using IR light, for example allowing the optical system to be inspected using IR light during or after manufacture.

Embodiments of a small format factor camera with an optical system that includes prisms and/or filters as described herein may be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers, and so on. However, note that aspects of the optical system may be scaled up or down to provide cameras with larger or smaller package sizes. In addition, embodiments of the camera system may be implemented as stand-alone digital cameras. In addition to still (single frame capture) camera applications, embodiments of the camera system may be adapted for use in video camera applications. In addition to visible light camera applications, embodiments of the prisms and filters may be used in infrared camera applications. In some embodiments, a camera as described herein may be included in a device along with one or more other cameras such as a wider-field small format camera or a telephoto or narrow angle small format camera, which would for example allow the user to select between the different camera formats (e.g., normal, telephoto or wide-field) when capturing images with the device. In some embodiments, two or more small format cameras as described herein may be included in a device, for example as front-facing and rear-facing cameras in a mobile device.

Figure 14:
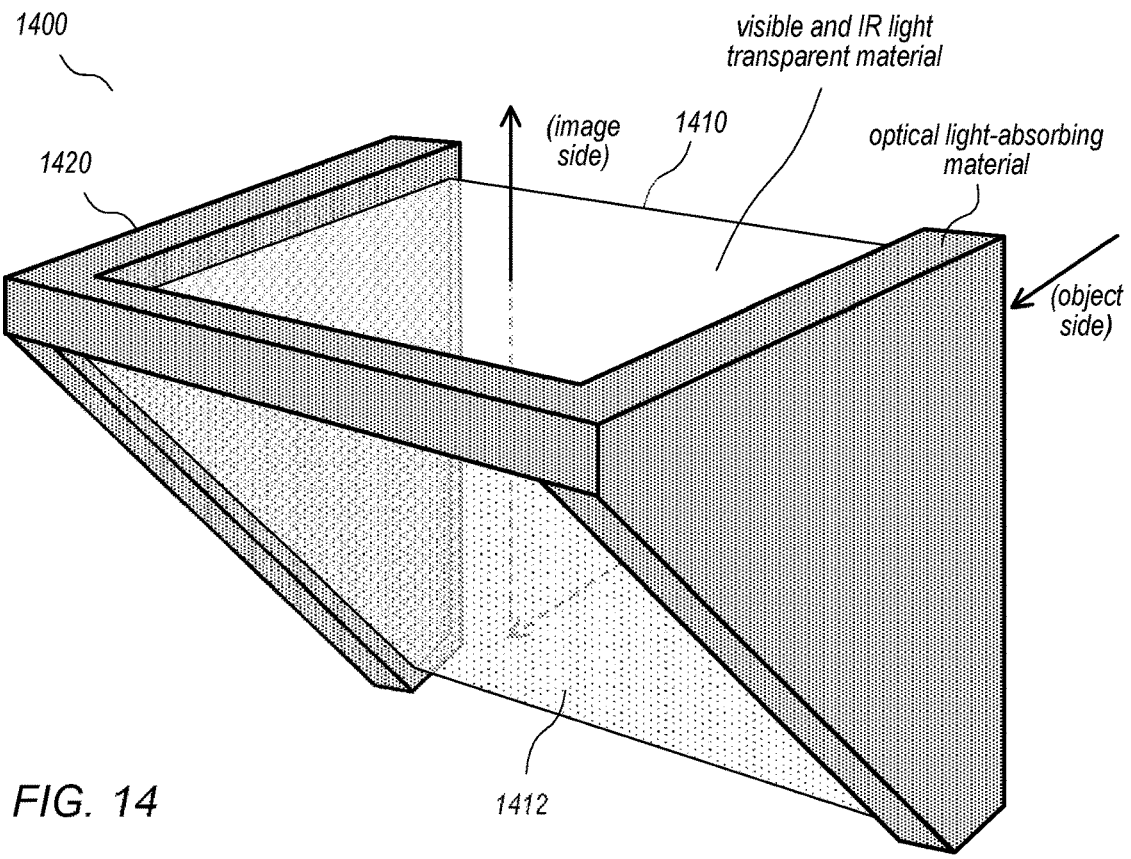
FIG. 14 illustrates an example prism formed with a light-absorbing holder, according to some embodiments.

FIG. 14 illustrates an example prism 1400 formed with a light-absorbing holder 1420, according to some embodiments. The effective area 1410 of the prism may be composed of a visible and infrared (IR) light transparent optical material. The holder 1420 is composed of an optical material that absorbs light that enters the holder 1420. Light entering an object side of the prism 1400 is redirected by a reflective side 1412 of the prism, thus folding the optical axis, and exits at an image side of the prism 1400. Using a light-absorbing material for the holder 1420 may reduce or eliminate optical aberrations such as flare caused by TIR of light at the off-axis sides of the prism 1400. In addition, the holder 1420 may be less thick than conventional holders for prisms as illustrated in FIG. 13C.

Figure 15:
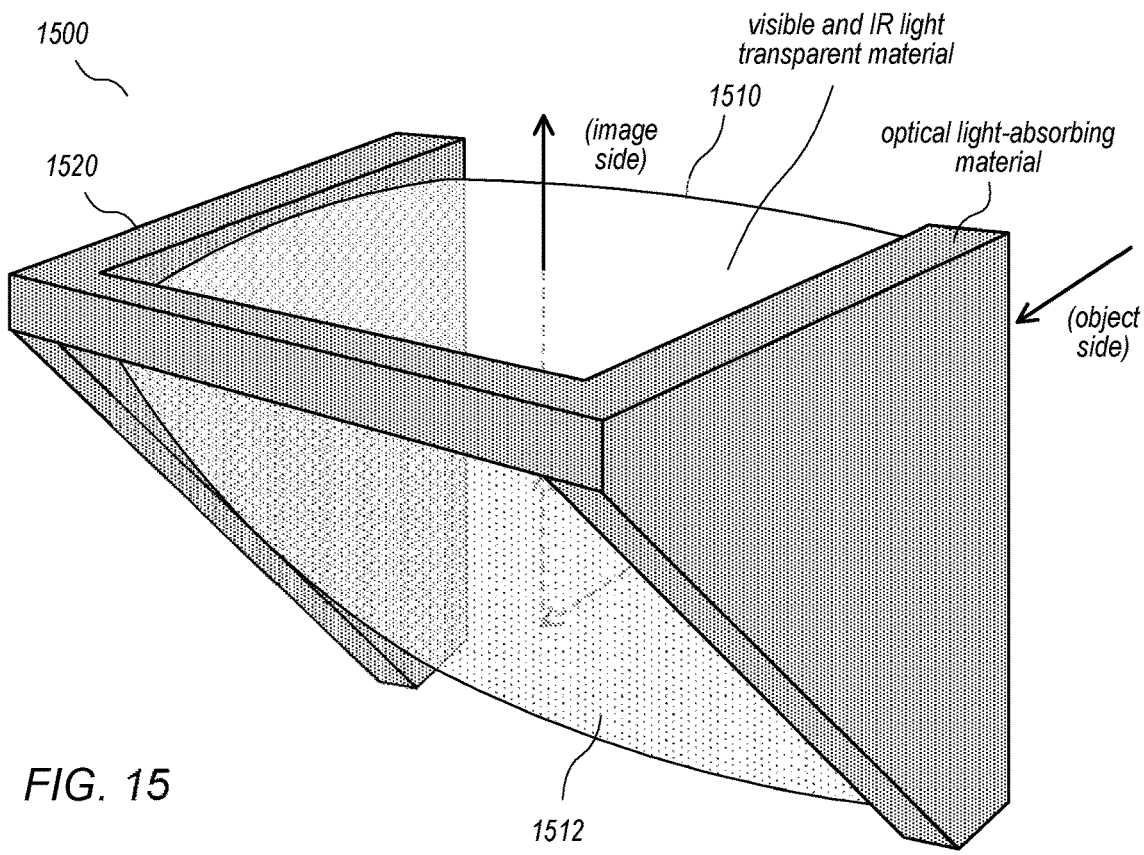
FIG. 15 illustrates an example prism with optical power formed with a light-absorbing holder, according to some embodiments.

FIG. 15 illustrates an example prism 1500 with optical power formed with a light-absorbing holder 1520, according to some embodiments. In the example prism 1400 of FIG. 14, the object side, reflective side 1412, and image side of the effective area 1410 are flat surfaces. In the example prism 1500 of FIG. 15, one or more of the object side, reflective side 1512, and image side of the prism 1500 may be curved surfaces (spherical, aspherical, convex, concave, etc.) so that the prism 1500 has positive or negative refractive power. The effective area 1510 of the prism may be composed of a visible and infrared (IR) light transparent optical material. The holder 1520 is composed of an optical material that absorbs light that enters the holder 1520. Light entering an object side of the prism 1500 is redirected by a reflective side 1512 of the prism, thus folding the optical axis, and exits at an image side of the prism 1500. Using a light-absorbing material for the holder 1520 may reduce or eliminate optical aberrations such as flare caused by TIR of light at the off-axis sides of the prism 1500. In addition, the holder 1520 may be less thick than conventional holders for prisms as illustrated in FIG. 13C.

Figure 16:
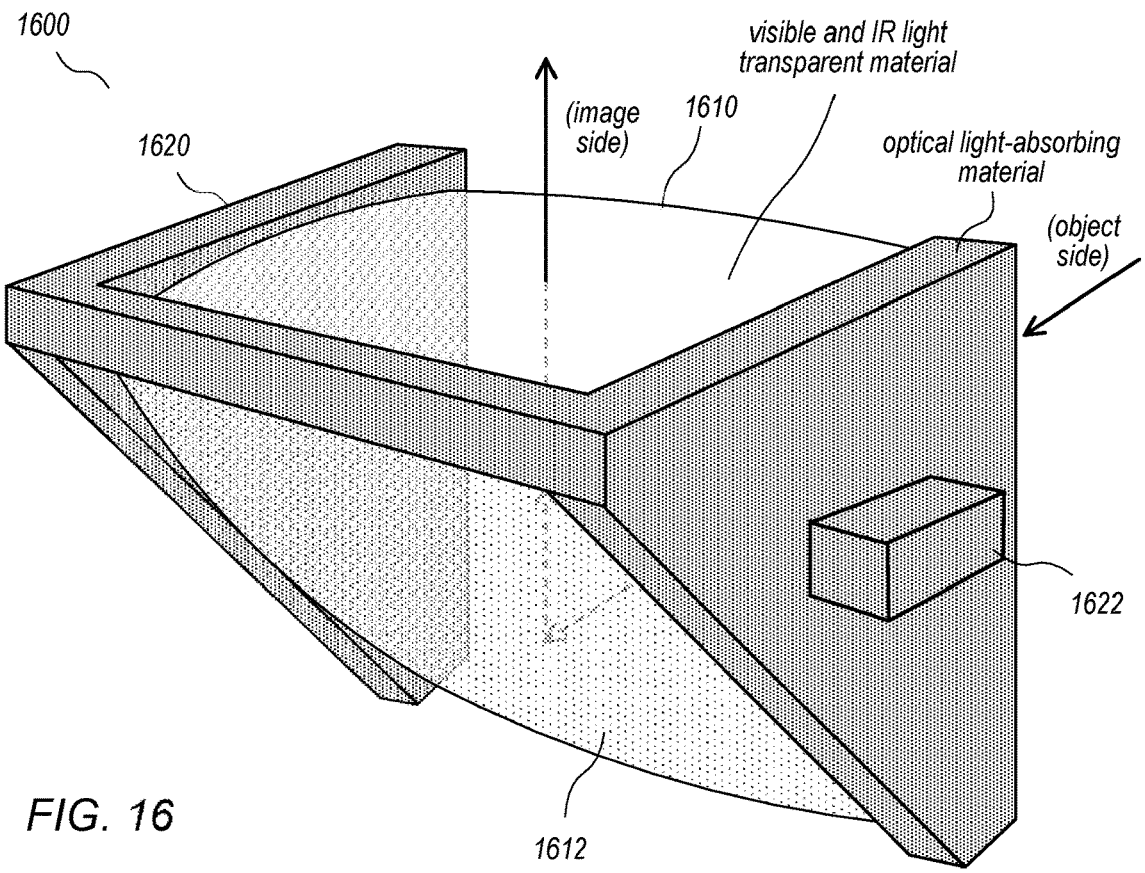
FIG. 16 illustrates an example prism with optical power formed with a light-absorbing holder that includes a mounting structure, according to some embodiments.

FIG. 16 illustrates an example prism 1600 with optical power formed with a light-absorbing holder 1620 that includes a mounting structure 1622, according to some embodiments. The effective area 1610 of the prism may be similar to that of the prisms 1400 and 1500 shown in FIGS. 14 and 15. However, the holder 1620 is formed with a mounting structure 1622 on the sides to facilitate mounting of the prism 1600 in an optical system/camera. The effective area 1610 of the prism may be composed of a visible and infrared (IR) light transparent optical material. The holder 1620 is composed of an optical material that absorbs light that enters the holder 1620. Light entering an object side of the prism 1600 is redirected by a reflective side 1612 of the prism, thus folding the optical axis, and exits at an image side of the prism 1600. Using a light-absorbing material for the holder 1620 may reduce or eliminate optical aberrations such as flare caused by TIR of light at the off-axis sides of the prism 1600. In addition, the holder 1620 may be less thick than conventional holders for prisms as illustrated in FIG. 13C.

Figure 17:
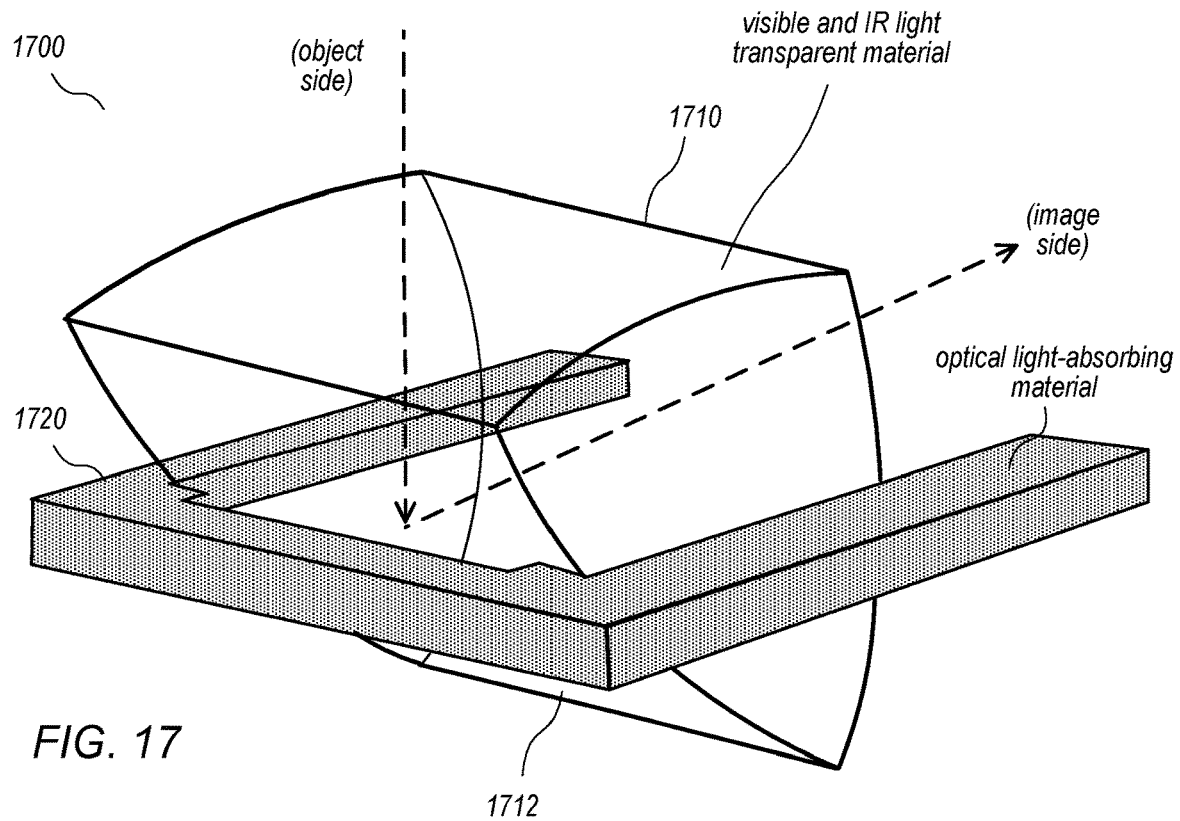
FIG. 17 illustrates an example prism formed with an alternative light-absorbing holder, according to some embodiments.

FIG. 17 illustrates an example prism 1700 formed with an alternative light-absorbing holder 1720, according to some embodiments. The effective area 1710 of the prism may be similar to that of the prisms 1400 and 1500 shown in FIGS. 14 and 15. However, the holder 1720 is more similar to a bracket, and does not cover the entire off-axis sides of the effective area 1710 of the prism. The effective area 1710 of the prism may be composed of a visible and infrared (IR) light transparent optical material. The holder 1720 is composed of an optical material that absorbs light that enters the holder 1720. Light entering an object side of the prism 1700 is redirected by a reflective side 1712 of the prism, thus folding the optical axis, and exits at an image side of the prism 1700. Using a light-absorbing material for the holder 1720 may help to reduce optical aberrations such as flare caused by TIR of light at the off-axis sides of the prism 1700. In addition, the holder 1520 may be smaller than conventional holders for prisms as illustrated in FIG. 13C.

Figure 18:
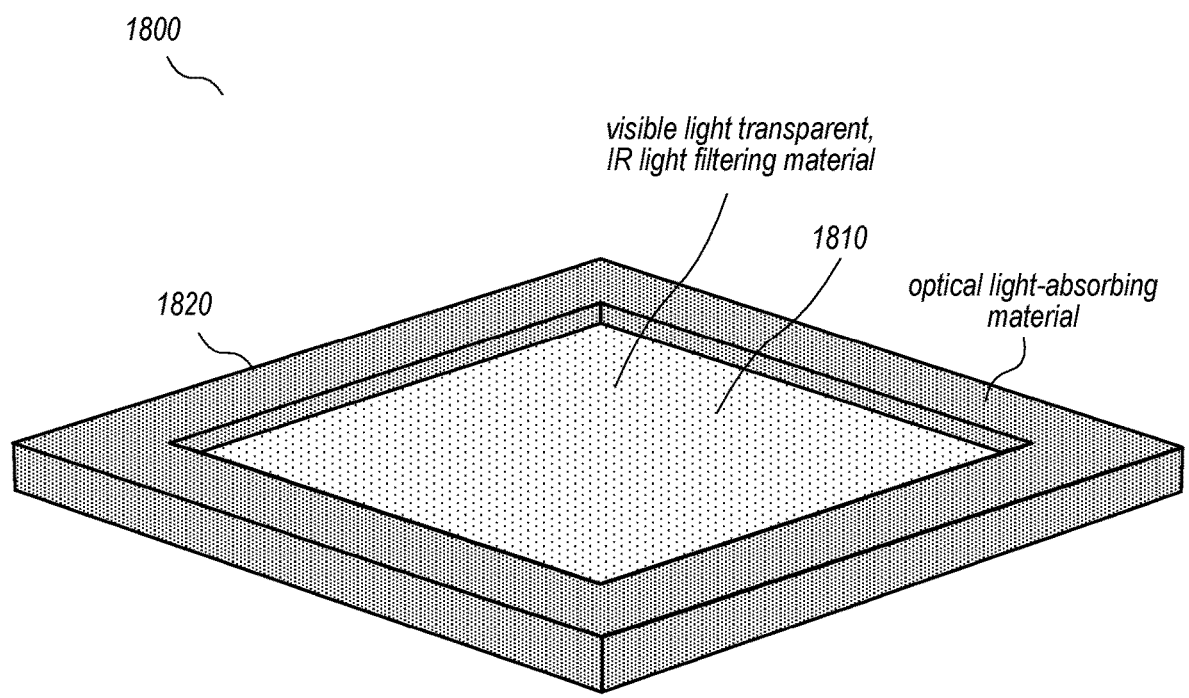
FIG. 18 illustrates an example filter formed with a light-absorbing holder, according to some embodiments.

FIG. 18 illustrates an example infrared (IR) filter 1800 formed with a light-absorbing holder 1820, according to some embodiments. The effective area 1810 of the filter may be composed of a visible light transparent and IR light absorbing optical material. The holder 1820 is composed of an optical material that absorbs light that enters the holder 1820. Using a light-absorbing material for the holder 1820 may reduce or eliminate optical aberrations such as flare caused by TIR of light at the sides of the filter 1800. In addition, the holder 1820 may be smaller than conventional holders for filters in optical systems.

While embodiments of lenses, prisms, and filters that are formed with light-absorbing flanges or holders are described herein, similar methods may be used to form other optical elements with light-absorbing flanges or holders.

Example Computing Device

Figure 19:
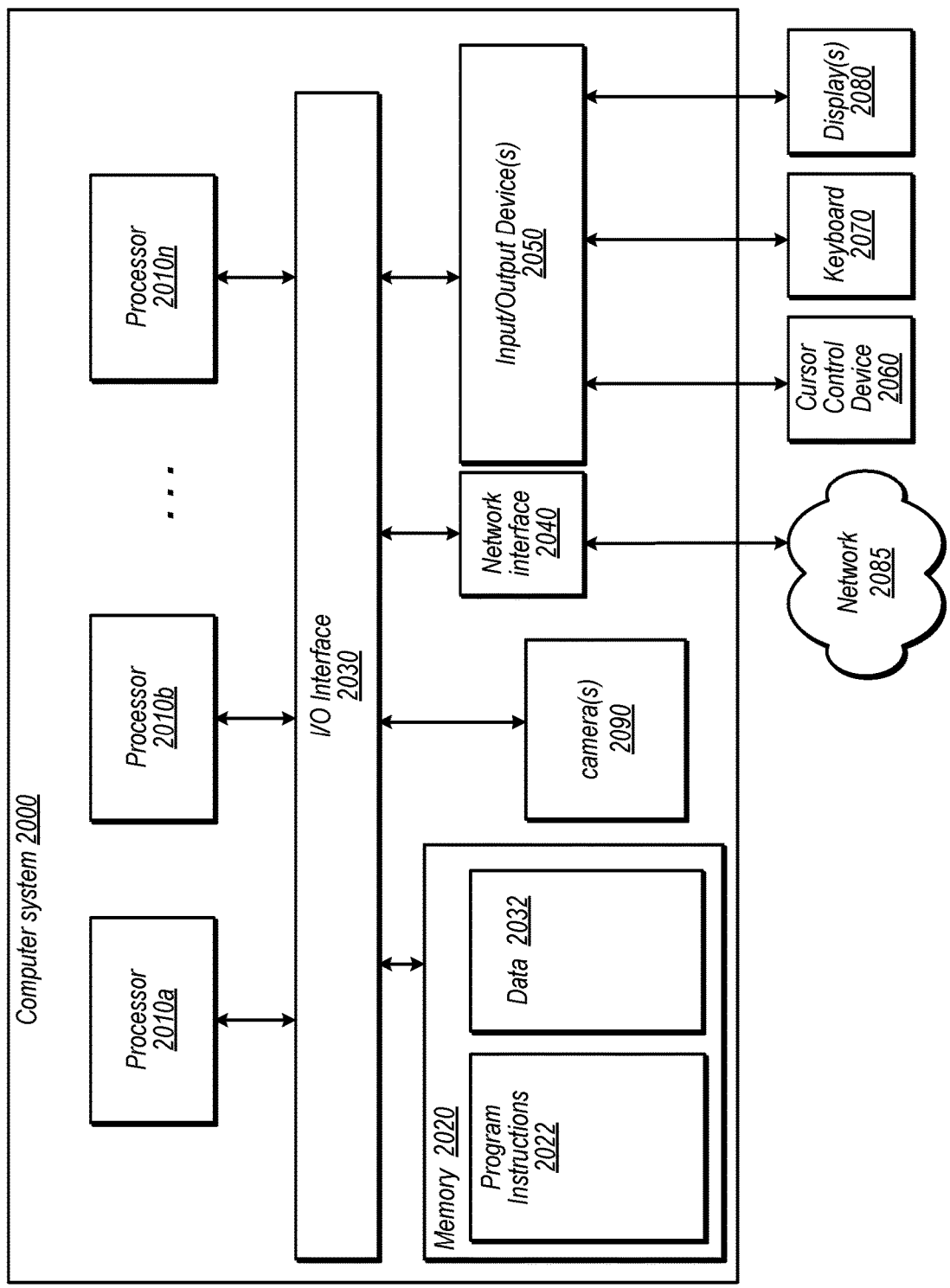
FIG. 19 illustrates an example computer system that may be used in embodiments.

FIG. 19 illustrates an example computing device, referred to as computer system 2000, that may include or host embodiments of the camera as illustrated in FIGS. 1 through 12. In addition, computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more cameras as described above with respect to FIGS. 1 through 19, which may also be coupled to I/O interface 2030, or one or more cameras as described above with respect to FIGS. 1 through 18 along with one or more other cameras such as wide-field and/or telephoto cameras.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 19, memory 2020 may include program instructions 2022, which may be processor-executable to implement any element or action to support integrated camera 2090, including but not limited to image processing software and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:
1. A lens system, comprising:
   a lens stack comprising a plurality of refractive lens elements arranged along an optical axis of the lens system;

wherein each of the refractive lens elements includes:
an effective area composed of a transparent optical material that is configured to receive light at an object side and transmit the received light toward an image side; and
a flange around the effective area, wherein at least a portion of the flange is composed of an optical light-absorbing material that is in direct contact with at least a portion of a lateral boundary of the effective area, wherein the direct contact is along an entirety of a thickness of the refractive lens element, the thickness extending from the object side to the image side, wherein the optical light-absorbing material absorbs at least a portion of light that enters the flange;
wherein the flanges of the refractive lens elements composed of the optical light-absorbing material allow the refractive lens elements to be arranged along the optical axis to form the lens stack without mounting the refractive lens elements in an opaque lens barrel.

2. The lens system as recited in claim 1, wherein the optical light-absorbing material absorbs light in a visible portion of the spectrum while transmitting at least a portion of light in an infrared portion of the spectrum.

3. The lens system as recited in claim 1, wherein the optical light-absorbing material absorbs light in a visible portion of the spectrum and light in an infrared portion of the spectrum.

4. The lens system as recited in claim 1, wherein a refractive index of the optical light-absorbing material is higher than a refractive index of the transparent optical material.

5. The lens system as recited in claim 1, wherein the transparent optical material and the optical light-absorbing material are optical plastic materials.

6. The lens system as recited in claim 5, wherein the refractive lens is formed using an injection molding process.

7. The lens system as recited in claim 6, wherein the refractive lens is formed using the injection molding process in which the flange is formed first, followed by the effective area.

8. The lens system as recited in claim 6, wherein the refractive lens is formed using the injection molding process in which the effective area is formed first, followed by the flange.

9. A device, comprising:
one or more processors;
a camera; and
a memory comprising program instructions executable by at least one of the one or more processors to control operations of the camera,
wherein the camera comprises:
a lens stack comprising a plurality of refractive lens elements arranged along an optical axis of the lens system; and
wherein each of the refractive lens elements includes:
an effective area composed of a transparent optical material that is configured to receive light at an object side and transmit the received light toward an image side; and
a flange around the effective area, wherein at least a portion of the flange is composed of an optical light-absorbing material that is in direct contact with at least a portion of a lateral boundary of the effective area, wherein the direct contact is along an entirety of a thickness of the refractive lens element, the thickness extending from the object side to the image side, wherein the optical light-absorbing material absorbs at least a portion of the light that enters the flange;
wherein the flanges of the refractive lens elements composed of the optical light-absorbing material allow the refractive lens elements to be arranged along the optical axis to form the lens stack without mounting the refractive lens elements in an opaque lens barrel.

10. The device as recited in claim 9, wherein the optical light-absorbing material absorbs light in a visible portion of the spectrum while transmitting at least a portion of light in an infrared portion of the spectrum.

11. The device as recited in claim 9, wherein the optical light-absorbing material absorbs light in a visible portion of the spectrum and light in an infrared portion of the spectrum.

12. The device as recited in claim 9, wherein a refractive index of the optical light-absorbing material is higher than a refractive index of the transparent optical material.

13. The device as recited in claim 9, wherein the transparent optical material and the optical light-absorbing material are optical plastic materials.

14. The device as recited in claim 9, further comprising at least one aperture stop.

15. A camera, comprising:
a photosensor configured to capture light projected onto a surface of the photosensor; and
a lens system configured to refract light from an object field located in front of the camera to form an image of a scene at an image plane at or near the surface of the photosensor, wherein the lens system comprises a lens stack comprising a plurality of refractive lens elements arranged along an optical axis of the camera;
wherein each of the refractive lens elements includes:
an effective area composed of a transparent optical material that is configured to receive light at an object side and transmit the received light toward an image side; and
a flange around the effective area, wherein at least a portion of the flange is composed of an optical light-absorbing material that is in direct contact with at least a portion of a lateral boundary of the effective area, wherein the direct contact is along an entirety of a thickness of the refractive lens element, the thickness extending from the object side to the image side, wherein the optical light-absorbing material absorbs at least a portion of the light that enters the flange,
wherein the flanges of the refractive lens elements composed of the optical light-absorbing material allow the refractive lens elements to be arranged along the optical axis to form the lens stack without mounting the refractive lens elements in an opaque lens barrel.

16. The camera as recited in claim 15, wherein the optical light-absorbing material absorbs light in a visible portion of the spectrum while transmitting at least a portion of light in an infrared portion of the spectrum.

17. The camera as recited in claim 15, wherein the optical light-absorbing material absorbs light in a visible portion of the spectrum and light in an infrared portion of the spectrum.

18. The camera as recited in claim 15, wherein a refractive index of the optical light-absorbing material is higher than a refractive index of the transparent optical material.

19. The camera as recited in claim 15, wherein the transparent optical material and the optical light-absorbing material are optical plastic materials.

20. The camera as recited in claim 15, wherein the lens system further comprises at least one aperture stop.

21. The camera as recited in claim 15, further comprising one or more prisms configured to fold the optical axis of the camera, wherein at least one of the one or more prisms comprises:
- an effective area composed of a transparent optical material that transmits light; and
- a holder composed of an optical light-absorbing material.

22. The camera as recited in claim 15, further comprising an infrared filter comprising:
- an effective area composed of an optical material that transmits visible light and filters infrared light; and
- a holder composed of an optical light-absorbing material.

* * * * *